United States Patent [19]

Kim

[11] Patent Number: 5,515,108
[45] Date of Patent: May 7, 1996

[54] DIGITAL AUTOMATIC FREQUENCY CONTROL METHOD AND CIRCUIT THEREFOR

[75] Inventor: Tong-ha Kim, Seoul, Rep. of Korea

[73] Assignee: Samsung Electronics Corporation, Kyungki-do, Rep. of Korea

[21] Appl. No.: 291,846

[22] Filed: Aug. 17, 1994

[30] Foreign Application Priority Data

Aug. 18, 1993 [KR] Rep. of Korea ............... 93-16062
Mar. 8, 1994 [KR] Rep. of Korea ............... 94-4461

[51] Int. Cl.⁶ .................. H04N 9/89; H04N 9/44
[52] U.S. Cl. .............. 348/498; 348/540; 348/536; 348/520; 358/320
[58] Field of Search ................ 348/497, 498, 348/499, 540, 541, 546, 536, 537, 512, 500, 516–520, 523, 524, 521, 539, 708, 711, 713; 358/320, 324, 319, 339, 337, 327; 360/36.1, 36.2, 37.1; H04N 9/89, 9/87, 9/79, 9/45, 9/44

[56] References Cited

U.S. PATENT DOCUMENTS 4,475,244  10/1984  Taylor .................. 348/485
5,394,197   2/1995  Kim .................... 348/713
5,412,481   5/1995  Ko et al. .............. 358/320

*Primary Examiner*—Safet Metjahic
*Attorney, Agent, or Firm*—Sughrue, Mion, Zinn, Macpeak & Seas

[57] ABSTRACT

A digital automatic frequency controlling method and circuit therefor in which a digital horizontal sync signal is separated from an input horizontal sync signal in response to a system clock, a horizontal sync separation point value is extracted, an actual horizontal sync period is calculated by using the digital horizontal sync signal and the clock pulse number within one horizontal sync period, a line jitter amount is calculated by subtracting a standard horizontal sync period from the actual horizontal sync period, a correction coefficient in response to the line jitter amount is generated to modulo-operate a standard frequency down-converting carrier color signal and to thereby generate a new frequency down-converting carrier color signal having compensated line jitter.

16 Claims, 10 Drawing Sheets

FIG. 1 (PRIOR ART)
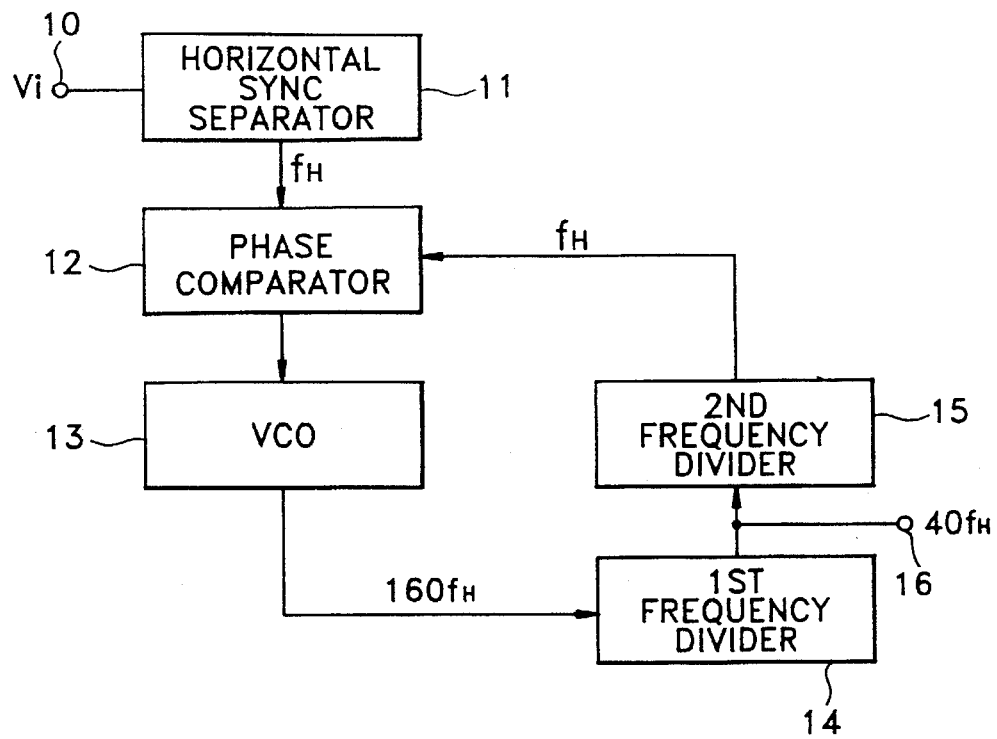
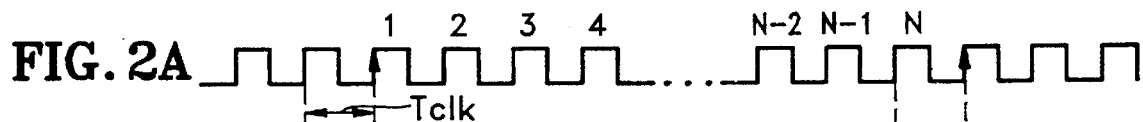
FIG. 2A
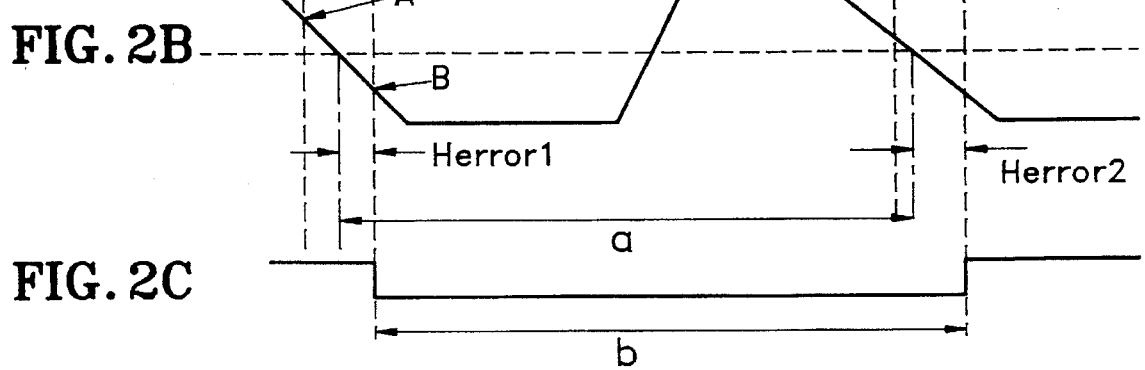
FIG. 2B
FIG. 2C
FIG. 3A
FIG. 3B

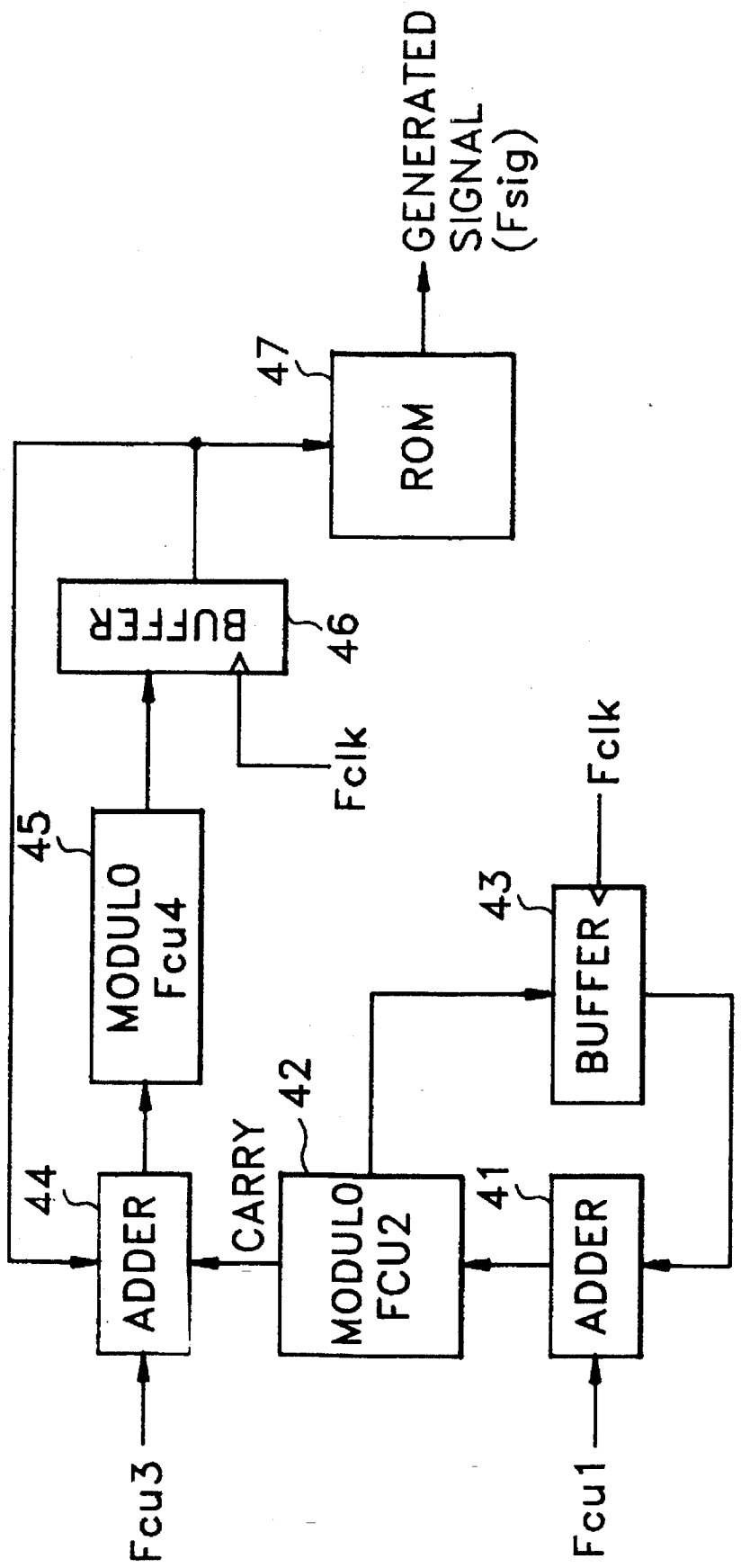

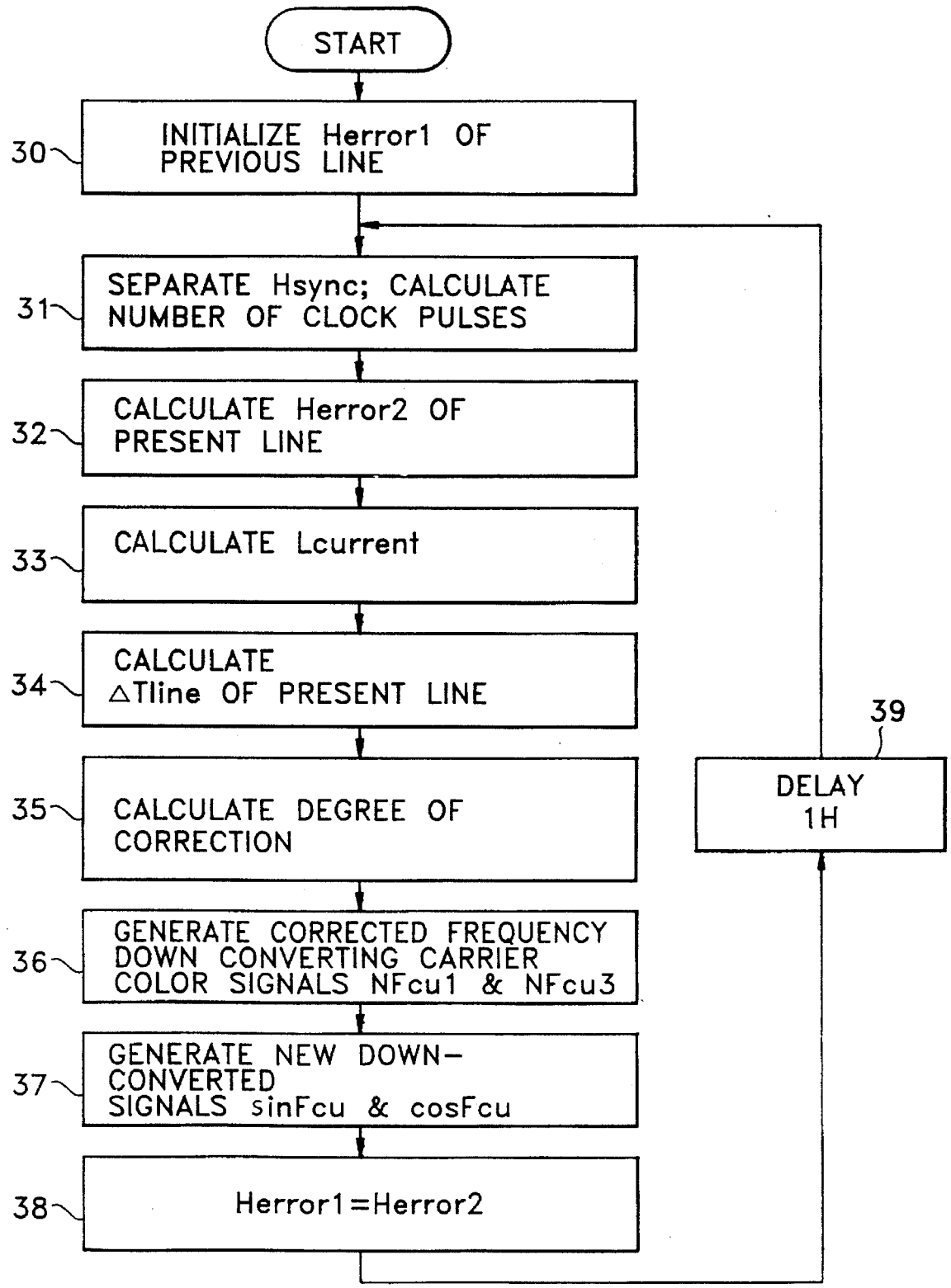

Fclk

Thr Hsync

SEP_E

MHsync

3DMHsync

N_CNT

N

A

B

Herror1

Herror2

PNFcu1

PNFcu3

NFcu1

NFcu3 sinFcu, cosFcu

DIGITAL AUTOMATIC FREQUENCY CONTROL METHOD AND CIRCUIT THEREFOR

BACKGROUND OF THE INVENTION

The present invention relates to an automatic frequency control (AFC) method and circuit therefor, and more particularly, to a digital type of automatic frequency control method and circuit therefor.

Generally, in an image processing system such as a video cassette recorder, an automatic frequency control (AFC) function is used to generate a frequency down-converting carrier color signal Fcu (i.e., 629 KHz in the case of NTSC systems) in accordance with a horizontal sync signal. Such an AFC function is performed by the same circuitry for both reproducing and recording operations. As the reference signal for this function, however, the recording operation uses a horizontal sync signal (Hsync) detected from an input video signal, and the reproducing operation uses an Hsync signal detected from a reproduced video signal.

The reproduced Hsync signal generates a jitter phenomenon due to the characteristics of the particular head and tape used in a given apparatus. Accordingly, the originally recorded video signal is very difficult to reproduce correctly. Therefore, the frequency down-converting carrier color signal, which is generated in accordance with the minute frequency variations of the horizontal sync signal due to the jitter phenomenon, is controlled by the above automatic frequency control function, so that an original video signal may be reproduced correctly.

FIG. 1 is a block diagram illustrating a conventional analog type of automatic frequency control circuit.

Referring to FIG. 1, a horizontal sync separator 11 detects a horizontal sync signal whose frequency is $f_H$ from a video signal (Vi) input through an input node 10, and applies the detected signal to a phase comparator 12. Phase comparator 12 compares the phase of the output from horizontal sync separator 11 with the phase of a horizontal sync signal (whose frequency is also $f_H$) output from a second frequency divider 15 and converts the difference into a DC voltage. This difference is applied to a voltage-controlled oscillator (VCO) 13 which produces an output signal whose basic frequency is $160f_H$, and varies the frequency of the output signal in accordance with the received DC voltage. A first frequency divider 14 frequency-divides the output ($160f_H$) signal of VCO 13 by four and applies the resultant $40f_H$ (i.e., the down-converted color signal carrier) to an output node 16 and second frequency divider 15. Second frequency divider 15 frequency-divides this $40f_H$ signal by 40, so as to provide a feedback signal ($f_H$) to phase comparator 12.

The above conventional automatic frequency control circuit can be used when an analog type of video signal is processed, but cannot be used when a digital type of video signal is to be processed.

SUMMARY OF THE INVENTION

Accordingly, the object of the present invention is to provide an automatic frequency control method for automatically controlling the frequency when a digital type of video signal is processed, for solving the above problem.

The other object of the invention is to provide an automatic frequency control circuit most suitable for performing the above digital automatic frequency control method.

To accomplish the above objects, there is provided a digital automatic frequency controlling method comprising the steps of: (a) separating a digital horizontal sync signal from an input horizontal sync signal in response to a system clock, extracting a horizontal sync separation point value, and detecting the number of clock pulses within one horizontal sync period; (b) calculating an actual horizontal sync period using the digital horizontal sync signal, the horizontal sync separation point value and the clock pulse number within one horizontal sync period, and calculating a line jitter amount by subtracting a standard horizontal sync period from the actual horizontal sync period; and (c) modulo-operating the standard frequency down-converting carrier color signal in response to the line jitter amount, and thereby generating a new frequency-corrected frequency down-converting carrier color signal subcarrier.

There is provided a digital automatic frequency controlling circuit comprising:

horizontal sync signal conversion means for separating a digital horizontal sync signal from an input horizontal sync signal in response to a system clock, extracting a horizontal sync separation point value, and detecting the number of clock pulses within one horizontal sync period;

line jitter amount calculating means for calculating an actual horizontal sync period by using the digital horizontal sync signal, the horizontal sync separation point value and the clock pulse number within one horizontal sync period all of which are output from the horizontal sync conversion means, and calculating line jitter amount by subtracting a standard horizontal sync period from the actual horizontal sync period; and corrected-carrier color signal output means for modulo-operating the standard frequency down-converting carrier color signal in response to the line jitter amount output from the line jitter amount calculating means, and thereby generating a frequency-corrected frequency down-converting carrier color signal.

BRIEF DESCRIPTION OF THE DRAWINGS

The above objects and advantages of the present invention will become more apparent from the following description of a preferred embodiment thereof with reference to the attached drawings in which:

FIG. 1 is a block diagram illustrating a conventional analog type of automatic frequency control circuit;

FIGS. 2A–2C are waveform diagrams illustrating the concept of detecting a horizontal sync period;

FIGS. 3A and 3B are waveforms of carrier color signals for standard frequency down-converting and for corrected frequency down-converting, respectively, according to the present invention, respectively;

FIG. 4 is a block diagram that is useful for explaining how a signal having an arbitrary frequency can be generated by the use of a general modulo counter;

FIG. 5 is a flow chart for explaining an automatic frequency control method of the present invention;

DETAILED DESCRIPTION OF THE INVENTION

Figure 6:
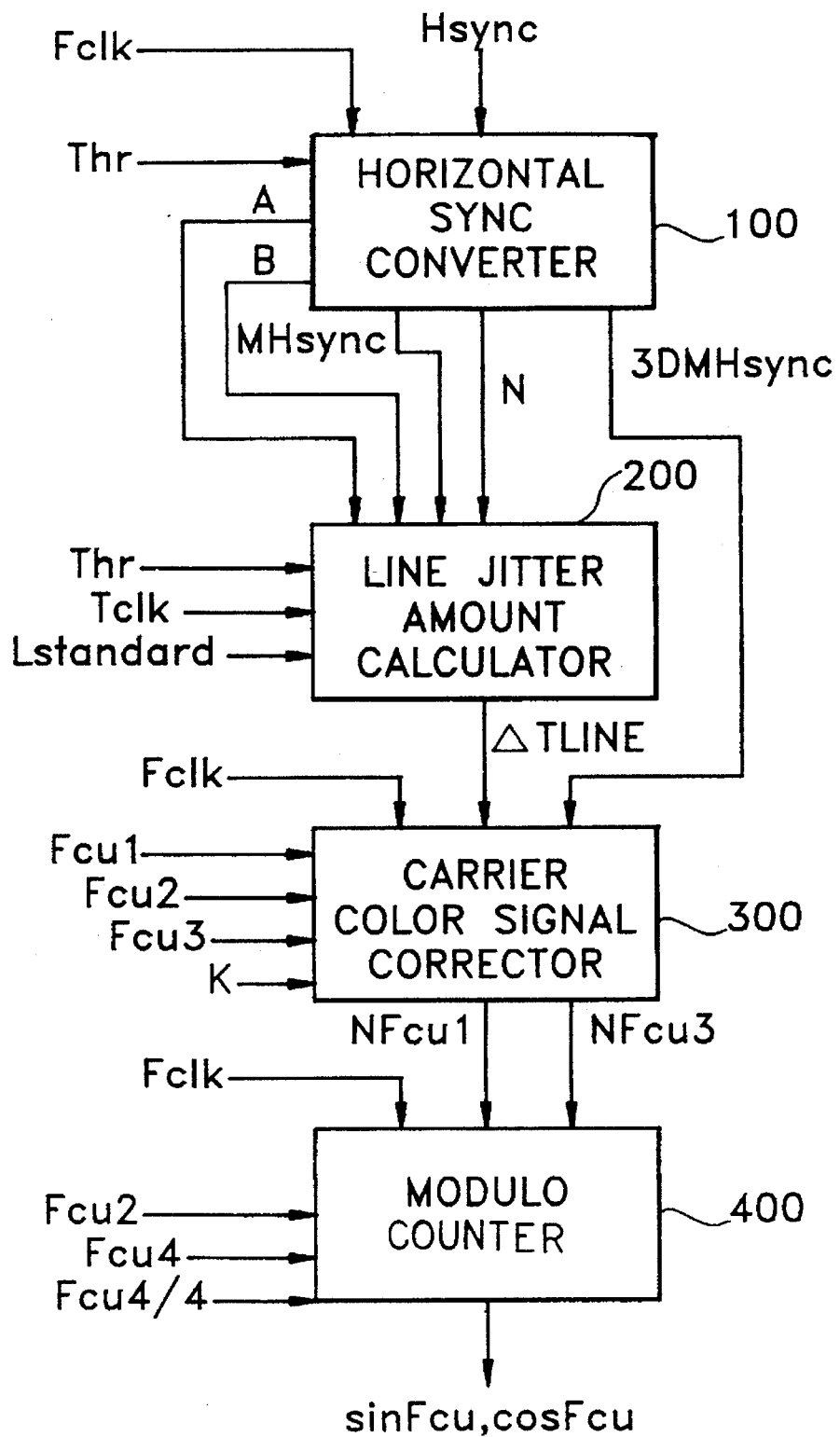
FIG. 6 is a block diagram of a digital automatic frequency control circuit according to an embodiment of the present invention.

It is difficult to implement in a digital system the typical AFC structure and method, such as a phase-locked loop (PLL) for producing an arbitrary frequency signal, that is used in an analog type system. However, because AFC affects the image quality, it should be implemented in a digital type system.

A color signal input for a recording system is a signal which has been balance-modulated using a carrier signal whose frequency is Fsc (about 3.58 MHz for NTSC systems). In a VCR, the carrier signal which is used for balance-modulating is frequency down-converted from Fsc (3.58 MHz) to Fcu (629 KHz) using a color frequency down-converting method. For reproduction, an original video signal is reproduced by the reverse converting process such that a recorded color signal whose carrier frequency is Fcu (629 KHz) is converted into a signal whose carrier frequency is Fsc (3.58 MHz) or the original balance-modulating carrier frequency.

If this relationship is represented as a mathematical expression, the color signal Cor1 input when recording, the color signal Cor2 which is recorded on a tape and the color signal Cor3 picked up from the tape, are as follows.

$$Cor1 = (B-Y)\sin(2\pi Fsct) + (R-Y)\cos(2\pi Fsct) \quad \text{equation-(1)}$$

$$Cor2 = (B-Y)\sin(2\pi Fsct) + (R-Y)\cos(2\pi Fsct) \quad \text{equation-(2)}$$

$$Cor3 = (B-Y)\sin[2\pi(Fcu+\Delta f)t] + (R-Y)\cos[2\pi(Fcu+\Delta f)t] \quad \text{equation-(3)}$$

Referring to equation (3), the horizontal sync period in a color signal input to a VCR during reproduction is not constant due to the characteristics of the tape and the characteristics of elements such as a head. Accordingly, for removing jitter components generated between lines, the present invention produces a new frequency down-converted carrier color signal to eliminate the frequency component $\Delta f$ corresponding to the jitter component of an input signal. For explaining the elimination of the jitter component using mathematical expressions, we assume that a frequency down-converted carrier color signal Fcu1' to be multiplied by a B-Y color signal and a frequency down-converted carrier color signal Fcu2' to be multiplied by an R-Y color signal when reproducing, are expressed as follows.

$$Fcu1' = \sin[2\pi(Fcu+\Delta f)t] \quad \text{equation-(4)}$$

$$Fcu2' = \cos[2\pi(Fcu+\Delta f)t] \quad \text{equation-(5)}$$

If so, the input color signal reproduced from the tape and represented by equation (3) above, should be multiplied by the frequency down-converting carrier color signals represented by equations (4) and (5), respectively, and then the resulting products should be added. In other words, {equation (3)×equation (4)}+{equation (3)×equation (5)} is performed. The resulting sum is passed through a low-pass filter and then the filtered result is output as B-Y and R-Y, respectively. If the B-Y and R-Y signals are again balance-modulated using $\sin(2\pi Fsct)$ and $\cos(2\pi Fsct)$, a color signal output, Cor4, can be produced, which is the same as the original video signal. This signal is expressed in the following equation (6).

$$Cor4 = (B-Y)\sin(2\pi fsct) + (R-Y)\cos(2\pi fsct) \quad \text{equation(6)}$$

In the above equations (4) and (5), if a carrier whose frequency is compensated by $\Delta f$ is not multiplied with equation (3), the carrier of the original input video signal is produced and varied by $\Delta f$. Accordingly, the present invention has the object that $\Delta f$ is obtained and then new sine and cosine frequency down-converting carrier color signals $\sin[2\pi(Fcu+\Delta f)t]$ and $\cos[2\pi(Fcu+\Delta f)t]$ are produced in order for a color signal same with the original recorded (or transmitted) signal to be reproduced (or received).

FIGS. 2A–2C are waveform diagrams illustrating the concept of detecting a horizontal sync period, and is helpful in understanding the present invention.

A horizontal sync separating error, Herror, is an error generated due to the fact that in a digital system the signal is not continuous. This error is inevitably generated by the process of converting an analog horizontal sync signal into a digital horizontal sync signal Hsync. The horizontal sync separating error, Herror, is the clock error generated when the latter digital horizontal sync signal is separated.

FIG. 2A illustrates a system clock SYS CLK having the period Tclk. In FIG. 2A, the number of cycles 1, 2, 3, ..., N represent the number of system clock pulses during a digital horizontal sync period. FIG. 2B illustrates the horizontal sync signal input after digitization, and the dashed line represent a reference level, Thr, for detecting the start and end of the horizontal sync period. Therefore, an actual horizontal sync period corresponds to the period "a." Herror1 is a horizontal sync separating error of the previous horizontal line, and Herror2 is a horizontal sync separating error of the current horizontal line. As seen in the drawing, the Herror is the difference between the point at which the horizontal sync signal crosses the threshold (dashed horizontal line if FIG. 2B) and the rise of the next clock pulse. This is error caused by digitizing the horizontal sync signal. This difference between the starting point of the actual horizontal sync period and the start point of the digital horizontal sync period, which is separated at the rising edge of the system clock, is the horizontal sync separating error Herror.

In FIG. 2B, "A" is the magnitude (a first horizontal sync separating point value) of the input horizontal sync signal at the rising edge of the just previous system clock prior to separating, and "B" is the magnitude (a second horizontal sync separating point value) of the input horizontal sync signal at the rising edge of the system clock at the time of separating.

FIG. 2C illustrates the digital horizontal sync signal separated in accordance with the system clock, and the digital horizontal sync period is shown as period "b."

In FIGS. 2A–2C, the calculation of the jitter amount ($\Delta$Tline) generated in the current line is performed as follows.

First, if we assume the proportional characteristic of a triangle is used, then the ratio of (A-B):Tclk is the same as (Thr-B):Herror1, and the following can be obtained.

$$Herror1 = \frac{Tclk(Thr-B)}{A-B} \quad \text{equation-(7)}$$

$$\frac{\text{Herror1}}{\text{Tclk}} = \frac{(\text{Thr} - B)}{A - B} \quad \text{equation-(8)}$$

Line jitter amount ΔTline is defined by the following equation-(9).

$$\Delta\text{Tline} = \text{Lcurrent} - \text{Lstandard} \quad \text{equation-(9)}$$

Here, Lstandard is the time interval of standard horizontal sync signal $1/f_h$ in case of no jitter, and Lcurrent is the time interval of the horizontal sync signal of the current line in which jitter is generated and Lcurrent is the period represented as "a" in FIG. 2B. Therefore, with consideration of the horizontal sync separating error, the actual horizontal sync period (Lcurrent) of the current line is represented by the following equation-(10).

$$\text{Lcurrent} = N\text{Tclk} + \text{Herror1} - \text{Herror2} \quad \text{equation-(10)}$$

In equation-(10), N is the number of system clock pulses of the separated digital horizontal sync signal Hsync, and Tclk is the time interval 1/Fclk corresponding to the period of the system clock being used for separating the digital horizontal sync signal Hsync. Herror1 and Herror2, as described above, are horizontal sync separating errors of the previous line and of the current line, respectively. Horizontal sync separating error Herror requires a multiplier for multiplying it with the system clock Tclk, as per equation-(7). Accordingly, equation-(10) needs three multipliers.

In order to reduce the number of multipliers, if Tclk is separated to the front, then $$\text{Lcurrent} = \text{Tclk}\left(N + \frac{\text{Herror1}}{\text{Tclk}} - \frac{\text{Herror2}}{\text{Tclk}}\right) \quad \text{equation-(11)}$$

In the above equation-(11), the values of Herror1/Tclk and Herror2/Tclk are calculated using equation-(8). Accordingly, since the standard horizontal sync period Lstandard of equation-(9) is already known, the actual horizontal sync period Lcurrent is produced based on equation-(11), so that the line jitter amount ΔTline of the current line is easily produced. If the line jitter amount ΔTline is produced, the time component ΔTcu of jitter corresponding to one cycle of the carrier color signal of standard frequency down-converting can be produced. In other words, $$\Delta\text{Tcu} = \frac{1}{\Delta f} \quad \text{equation-(12)}$$
$$= \frac{\Delta\text{Tline}}{\text{Cyc}_{Fcu}}$$

Here, ΔTline is the real time interval of the line jitter, and $\text{Cyc}_{Fcu}$ is the number of overall cycles of Fcu for one line when the standard signal is input to the system and is a predetermined value (for example, 629 KHz/15.75KHz for NTSC systems).

Accordingly, the frequency of a new frequency down-converting carrier signal $\text{New}_{Fcu}$ is calculated, considering the jitter of the current line.

Assuming that the time interval of one cycle of the standard frequency down-converting carrier color signal Fcu is Tcu, the new frequency down-converting carrier color signal $\text{New}_{Fcu}$ can be calculated. That is, assuming that the ratio of 1/Tcu:Fcu is the same as 1/(Tcu+ΔTcu):$\text{New}_{Fcu}$, then $$\text{New}_{Fcu} = \text{Fcu}\left(\frac{\text{Tcu}}{\text{Tcu} + \Delta\text{Tcu}}\right) \quad \text{equation-(13)}$$
$$= \text{Fcu}\left(\frac{\text{Tcu} + \Delta\text{Tcu} - \Delta\text{Tcu}}{\text{Tcu} + \Delta\text{Tcu}}\right)$$

That is, $\text{New}_{Fcu}$ further includes the term Fcu(ΔTcu/Tcu+ΔTcu) in the frequency of the standard frequency down-converting carrier color signal Fcu.

Considering the real case for implementation of the result of the equation-(13), the relationship of ΔTcu<<Tcu is true in a general VCR system. Using this relationship the above equation can be simplified as the following.

$$\text{New}_{Fcu} = \text{Fcu} - \text{Fcu}\left(\frac{\Delta\text{Tcu}}{\text{Tcu}}\right) \quad \text{equation-(14)}$$

If the term ΔTcu in the equation-(14) is substituted by the value of $\Delta\text{Tline}/\text{Cyc}_{Fcu}$, the final frequency can be represented as the following equation-(15).

$$\text{New}_{Fcu} = \text{Fcu} - \text{Fcu}\left(\frac{\Delta\text{Tline}}{\text{Cyc}_{Fcu} \times \text{Tcu}}\right) \quad \text{equation-(15)}$$

Accordingly, FIG. 3A is a waveform illustrating one cycle of the standard frequency down-converting carrier color signal, FIG. 3B is a waveform illustrating one cycle of the new frequency down-converting carrier color signal compensated by ΔTcu, and it can be known that the compensated and new frequency down-converting carrier color signal has a longer period than that of the standard frequency down-converting carrier color signal (shown in FIG. 3A) by ΔTcu.

FIG. 4 is a block diagram that is useful for explaining how a signal having an arbitrary frequency can be generated by the use of a general modulo counter. The composition and the operation of the modulo counter shown in FIG. 4 are disclosed at pp137–pp139 of *"Digital Television"* described by C. P. Sandbanker and published by John Wiley & Sons. For an understanding of the present invention, examples will be described below.

Provided that the frequency of the signal to be produced is Fsig and the frequency of the clock used for the operation of the modulo counter is Fclk, the ratio of the above two signals is the following.

$$\frac{\text{Fsig}}{\text{Fclk}} = \frac{X}{Y} \quad \text{equation-(16)}$$

Here, X and Y are positive integers and have no common measure.

For example, if Fsig is 46.875 KHz (375/8 KHz) and Fclk is 864KHz, then In the above equation, it is shown that X is 125 and Y is 2,304.

Since the address number Y of ROM 47 needed for implementing Fsig of the above example is 2304, the signal of one cycle is uniformly sampled 2304 times so as to be stored $$\frac{\text{Fsig}}{\text{Fclk}} = \frac{X}{Y} \quad \text{equation-(17)}$$
$$= \frac{375/8}{864}$$
$$= \frac{375}{6912}$$
$$= \frac{125}{2304}$$

and the address of the data is increased by 125 and then modulo-operated by 2304 and the result is stored.

At this time, if the size of ROM 47 is determined to be 2304, N should be 12 in case of using a $2^n$ type of ROM.

Accordingly, a large portion of the ROM storage is not used (i.e., 179B) and hence, wasteful. In addition, in case Y is large, the size of the ROM is so large that it increases the load of hardware implementation. Accordingly, it is necessary that the size of ROM is determined as a constant, arbitrary and suitable size. The following is the explanation that the size of ROM is not varied in accordance with an arbitrary frequency signal and is fixed as a constant value, while producing a desired signal. If the above equation-(17) is computed accordingly, then $$\frac{Fsig}{Fclk} = \frac{125}{2304}$$

$$= \frac{2048 \times 125}{2048 \times 2304}$$

$$= \frac{2048 \, (125/2304)}{2048}$$

$$= \frac{111 + 1/9}{2048}$$

which can be rewritten as equation (18) thus:

$$\frac{Fsig}{Fclk} = \frac{Fcu3 + Fcu1/Fcu2}{Fcu4} \qquad \text{equation-(18)}$$

In the above equation-(18), the size of ROM 47 is determined by a fourth coefficient Fcu4. It can be known that, for determination of an address of a data, the output of the second adder 44 is increased by Fcu3+Fcu1/Fcu2 every Fclk cycles, and a modulo operating result output from the second modulo register 45 is addressed. Here, Fcu1, Fcu2, Fcu3 and Fcu4 are a first, a second, a third and a fourth coefficients for modulo counting.

Fcu1/Fcu2 is not an integer, but is a real number value and the amount of the ROM address is determined as an integer, so Fcu1/Fcu2 is truncated at the decimal point and only its integer portion is used. In other words, the modulo operation by Fcu2 is made such that, the expression of Fcu1/Fcu2 is added every times, and then if the operating result is higher than Fcu2, the first modulo register 42 produces a "1," and otherwise produces a "0."

Since the figures below the decimal point are discarded when calculating an address, the accuracy of the produced data is reduced, but the size of ROM can effectively be reduced. As a result, it can be seen that, if one uses the described method to reduce the size of the ROM to a fixed size, the modulo operation is required twice.

Now, the generating method of frequency signal $New_{Fcu}$, which is jitter-compensated using the modulo counter explained with reference to FIG. 4, will be explained.

Assuming that Fsig is equal to Fcu (which is a standard AFC carrier signal with no jitter), the equation-(18) can be re-written as follows.

$$\frac{Fcu}{Fclk} = \frac{Fcu3 + Fcu1/Fcu2}{Fcu4} \qquad \text{equation-(19)}$$

$$= \frac{Fcu3 \, (Fcu2 + Fcu1)}{Fcu4 \times Fcu2}$$

For producing $New_{Fcu}$ using this equation-(19), the equation-(15) is re-written as follows.

$$\frac{New_{Fcu}}{Fclk} = \frac{Fcu}{Fclk} \left( 1 - \frac{\Delta Tline}{Cyc_{Fcu} \times Tcu} \right)$$

$$= \frac{Fcu3 \times Fcu2 + Fcu1}{Fcu4 \times Fcu2} \left( 1 - \frac{\Delta Tline}{Cyc_{Fcu} \times Tcu} \right)$$

$$= \frac{Fcu3 \times Fcu2 + Fcu1}{Fcu4 \times Fcu2} - \frac{Fcu3 \times Fcu2 + Fcu1}{Fcu4 \times Fcu2} \left( \frac{\Delta Tline}{Cyc_{Fcu} \times Tcu} \right)$$

$$= \frac{Fcu3 \times Fcu2 + Fcu1}{Fcu4 \times Fcu2} - \frac{\Delta Tline \left( \frac{Fcu3 \times Fcu2 + Fcu1}{Cyc_{Fcu} \times Tcu} \right)}{Fcu4 \times Fcu2}$$

Here, since $(Fcu3 \times Fcu2+Fcu1)/(Cyc_{Fcu} \times Tcu)$ is a function of Fcu1, Fcu2, Fcu3, Tcu and $Cyc_{Fcu}$, which are constants determined in accordance with a system, it can be substituted by a constant K.

Accordingly, the above equation can be re-written as follows.

equation-(20)
$$\frac{New_{Fcu}}{Fclk} = \frac{Fcu3 \times Fcu2 + Fcu1}{Fcu4 \times Fcu2} - \frac{(\Delta Tline) \times K}{Fcu4 \times Fcu2}$$

$$= \frac{(Fcu3 \times Fcu2 + Fcu1) - (\Delta Tline) \times K}{Fcu4 \times Fcu2}$$

$$= \frac{Fcu3 + \frac{Fcu1 - (\Delta Tline) \times K}{Fcu2}}{Fcu4}$$

For making the above equation-(20) into a final form suitable for modulo counter, since the $(\Delta Tline) \times K$ value is varied in accordance with the variation of the line jitter amount, Fcu1 and Fcu3 should be varied using new coefficients per lines.

Here, since Fcu2 and Fcu4 are the coefficients determining the size of ROM, Fcu2 and Fcu4 should be fixed. Since a predetermined frequency signal can be generated in accordance with Fcu1 and Fcu2 representing the increment of address, Fcu1 and Fcu3 are varied in accordance with the variation of the line jitter amount, so as to produce a new frequency down-converting carrier color signal $New_{Fcu}$. Accordingly, these coefficients can be determined. First, we solve for $$\frac{|Fcu1 - (\Delta Tline) \times K|}{Fcu2}$$

Then, we can say that a variable M is the whole integer of the quotient of the above expression, and R is the remainder thereof. If the value of Fcu1-ΔTlineK is greater than or equal to zero, that is to say, the period of the new frequency down-converting carrier color signal is larger than that of the standard frequency down-converting carrier color signal, then the following is true.

$$NFcu3 = Fcu3 + M \qquad \text{equation-(21)}$$

$$NFcu1 = R \qquad \text{equation-(22)}$$

Also, if the value of Fcu1 -ΔTlineK is less than zero, that is to say, the period of the new frequency down-converting carrier color signal is shorter than that of the standard frequency down-converting carrier color signal, then the following is true.

$$NFcu3 = Fcu3 - M - 1 \qquad \text{equation-(23)}$$

$$NFcu1 = Fcu2 - R \qquad \text{equation-(24)}$$

For simplifying the hardware composition, provided that |Fcu1-ΔTlineK| is within a predetermined value (for example, less than Fcu2), M is fixed as a predetermined number and only R is calculated, so that there may be many variative examples that only NFcu1 may be calculated, not varying NFcu3.

The output of modulo counter using NFcu1 and NFcu3, which are coefficients newly obtained as above, is as the following.

$$\frac{New_{Fcu}}{Fclk} = \frac{NFcu3 \, (Fcu2 + NFcu1)}{Fcu4 \times Fcu2} \qquad \text{equation-(25)}$$

$$= \frac{NFcu3 + \frac{NFcu1}{Fcu2}}{Fcu4}$$

FIG. 5 is a flowchart showing the process for performing a digital automatic frequency control method of the present invention.

Referring to FIG. 5, step 30 is for initialization, step is for horizontal sync separation, step 32 is for calculating a horizontal sync separation error, step 33 is for calculating an actual horizontal sync period, step 34 is for calculating a jitter amount, step 35 is for judging a correction degree, step 36 is for generating a coefficient for modulo counting, step 37 is for generating a new frequency down-converting carrier color signal, step 38 is for processing an isolation error, and step 39 is for returning to step 31 after the delay of one horizontal sync period 1H.

This can be explained in more detail as follows. In step 30, horizontal sync separation error Herror1 of the just previous line of the initial line is initialized to zero, and in step 31, a digital horizontal sync signal is separated from the input horizontal sync signal according to a system clock, and a number N of clock pulses is counted.

In step 32, a horizontal sync separation error Herror2 of the current line is calculated using equation (8).

In step 33, an actual period Lcurrent of a horizontal sync signal of the current line is calculated by using equation (11). In step 34, a jitter amount ΔTline is calculated by using equation (9).

In step 35, the required degree of correction for compensating the line jitter is calculated in accordance with the following expression.

$$Fcu1 - \Delta Tline \left( \frac{Fcu3 \times Fcu2 + Fcu1}{Cyc_{Fcu} \times Tcu} \right)$$

In step 36, based on the value obtained in step 35, correction coefficients NFcu1 and NFcu3 for modulo counting are calculated by using the expression $$\frac{|Fcu1 - (\Delta Tline) \times K|}{Fcu2}$$

and equations (21) to (24).

In step 37, a new frequency down-converting carrier color signal $New_{Fcu}$ is generated by using equation (25). In step 38, the horizontal sync separation error of the current line calculated in step 31 is substituted by the horizontal sync separation error (Herror1) of the previous line. In step 39, one horizontal sync period 1H is delayed. Then, the procedure goes back to step 31 so as to perform the same procedure for the next horizontal sync period.

FIG. 6 is a block diagram of an embodiment of an automatic frequency control circuit of the present invention.

The circuit shown in FIG. 6 is constituted by a horizontal sync converter 100 for receiving a horizontal sync signal Hsync, system clock signal Fclk and a reference level value Thr so as to extract first and second horizontal sync separation point values A and B, and outputting the number of clock pulses N, digital horizontal sync signal MHsync and the three-clock delayed digital horizontal sync signal 3DMHsync;

a line jitter amount calculator 200 for receiving, horizontal sync separation point values A and B, digital horizontal sync signal MHsync and the number of clock pulses N within a horizontal sync period output from horizontal sync converter 100, and for receiving a reference level value Thr, one cycle Tclk of system clock and standard horizontal sync period Lstandard supplied from the exterior so as to calculate a line jitter amount;

a carrier color corrector 300 for receiving system clock Fclk, first, second and third coefficient Fcu1, Fcu2 and Fcu3, constant K, line jitter amount ΔTline output from line jitter amount calculator 200 and three-clock delayed digital horizontal sync signal 3DMHsync output from horizontal sync converter 100 so as to output first and third correction coefficients NFcu1 and NFcu3; and a modulo counter 400 for receiving first and third correction coefficients NFcu1 and NFcu3 and second and fourth coefficients Fcu2 and Fcu4, and one quarter value of the fourth coefficient Fcu4 so as to generate the new sine and cosine frequency down-converting carrier color signal (sinFcu and cosFcu) for an automatic frequency control.

Figure 7:
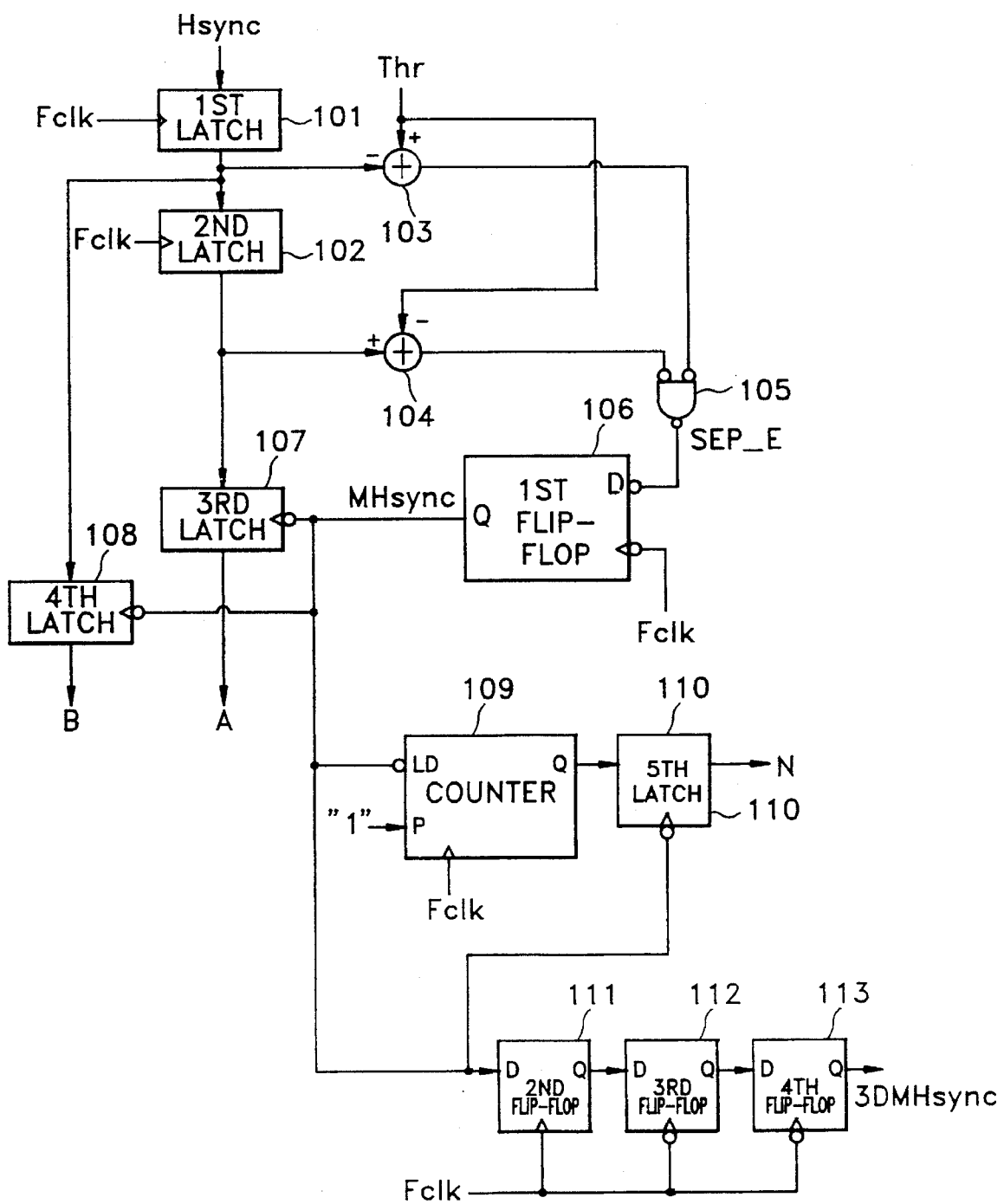
FIG. 7 is a detailed circuit diagram of the horizontal sync converting unit shown in FIG. 6.

FIG. 7 is a detailed circuit diagram of horizontal sync converter 100 shown in FIG. 6.

Horizontal sync converter 100 comprises a first latch 101 for latching horizontal sync signal Hsync by a system clock Fclk signal, a second latch 102 for re-latching, by using system clock Fclk signal, the horizontal sync signal latched and output from first latch 101, a first subtracter 103 for subtracting the horizontal sync signal which is output from first latch 101 from reference level value Thr, a second subtracter 104 for subtracting reference level value Thr from the horizontal sync signal which is latch-output from second latch 102, an OR gate 105 for receiving the signals respectively subtracted and output from first subtracter 103 and second subtracter 104 so as to logically sum the input signals, a first flip-flop 106 for delaying the signal output from OR gate 105 by employing system clock Fclk signal so as to output digital horizontal sync signal MHsync, a third latch 107 for latching, by using horizontal sync signal MHsync, the signal which is latch-output from second latch 102 so as to output first horizontal sync separation point value A, a fourth latch 108 for latching, by using digital horizontal sync signal MHsync, the signal latch-output from first latch 101 so as to output second horizontal sync separation point value B, a counter 109 for receiving the digital horizontal sync signal output from first flip-flop 106 to a load signal so as to count the number N of clock pulses of system clock Fclk signal, a fifth latch 110 for latching, by using a digital horizontal sync signal MHsync, the number of clock pulses N output from counter 109, and two to fourth flip-flops 111 to 113 for delaying by three clock pulses the digital horizontal sync signal MHsync according to system clock Fclk signal so as to output the three-clock delayed digital horizontal sync signal 3DMHsync.

Figure 8:
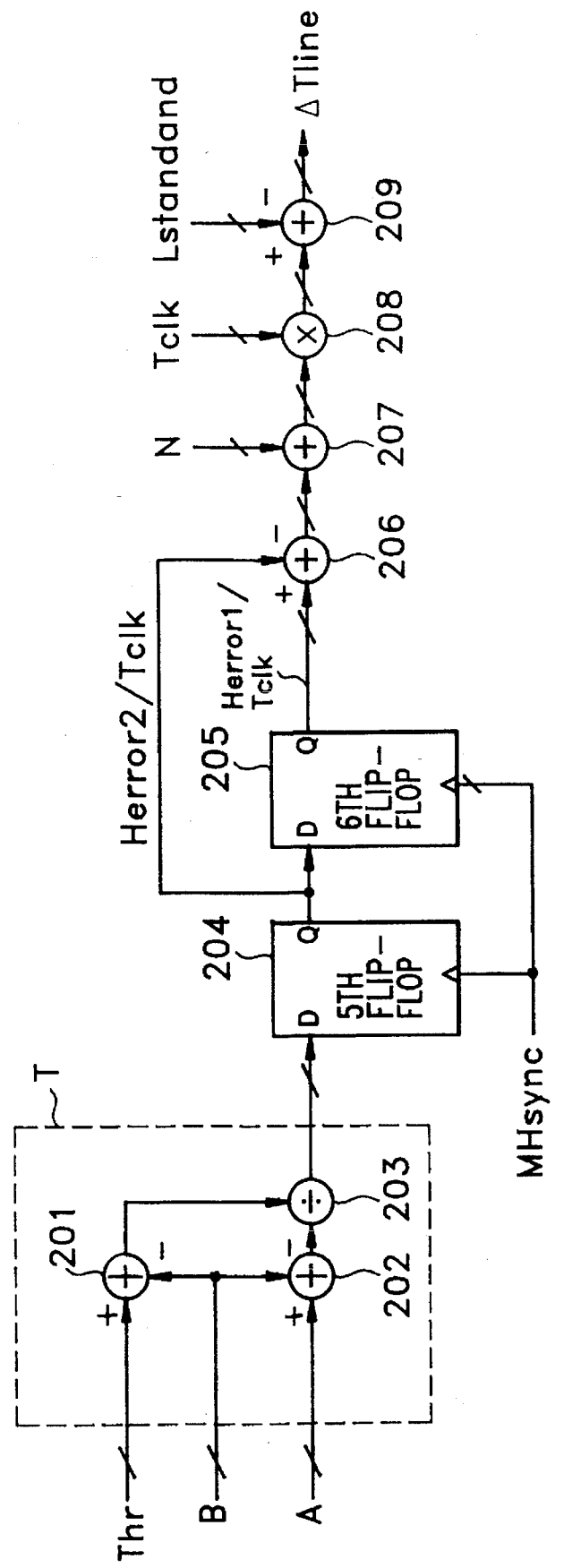
FIG. 8 is a detailed circuit diagram of the line jitter amount calculator shown in FIG. 6.

FIG. 8 is a detailed circuit diagram of line jitter amount calculator 200 shown in FIG. 6.

Line jitter amount calculator 200 is constituted by a third subtracter 201 for subtracting second horizontal sync separation point value B from reference level value Thr, a fourth subtracter 202 for subtracting second horizontal sync separation point value from first horizontal sync separation point value A, a first divider 203 for dividing the signal output from third subtracter 201 by the signal output from fourth subtracter 202, a fifth flip-flop 204 for delaying the signal output from first divider 203 by using digital horizontal sync signal MHsync so as to output a second separation error signal Herror2/Tclk, a sixth flip-flop 206 for delaying the second separation error signal Herror2/Tclk output from fifth flip-flop 204 by using digital horizontal sync signal MHsync so as to output first separation error signal Herror1/Tclk, a fifth subtracter 206 for subtracting second separation error signal Herror2/Tclk which is output from fifth flip-flop 204 from first separation error signal Herror1/Tclk which is output from sixth flip-flop 205 so as to output an error difference value, a first adder 207 for adding the error difference value output from fifth subtracter 206 to the number N of clock pulses within one horizontal sync period and which is output from fifth latch 110 of FIG. 7, a first multiplier 208 for multiplying the signal added and output from first adder 207 and one cycle Tclk of a system clock so as to output an actual horizontal sync period Lcurrent, and a sixth subtracter 209 for subtracting standard horizontal sync period Lstandard from the actual horizontal sync period Lcurrent output from first multiplier 208 so as to output a line jitter amount ΔTline.

Figure 9A:
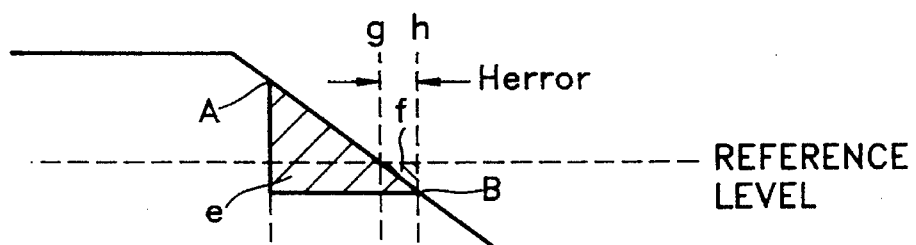
FIGS. 9A–9C are views for explaining the variations of "T" block shown in FIG. 8.
Figure 9B:
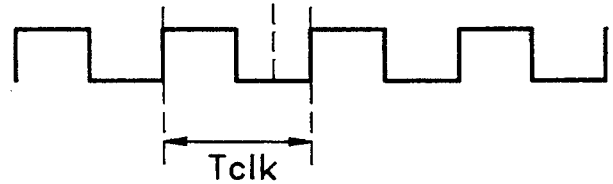
Figure 9C:
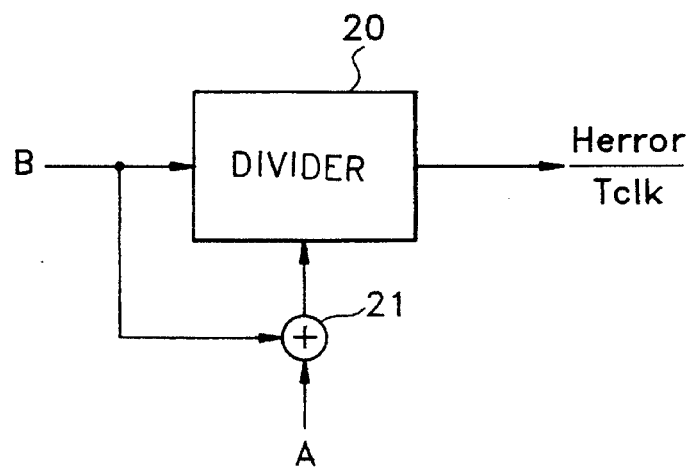

FIG. 9A to FIG. 9C illustrate another modified embodiment of the block T shown in FIG. 8.

Figure 10:
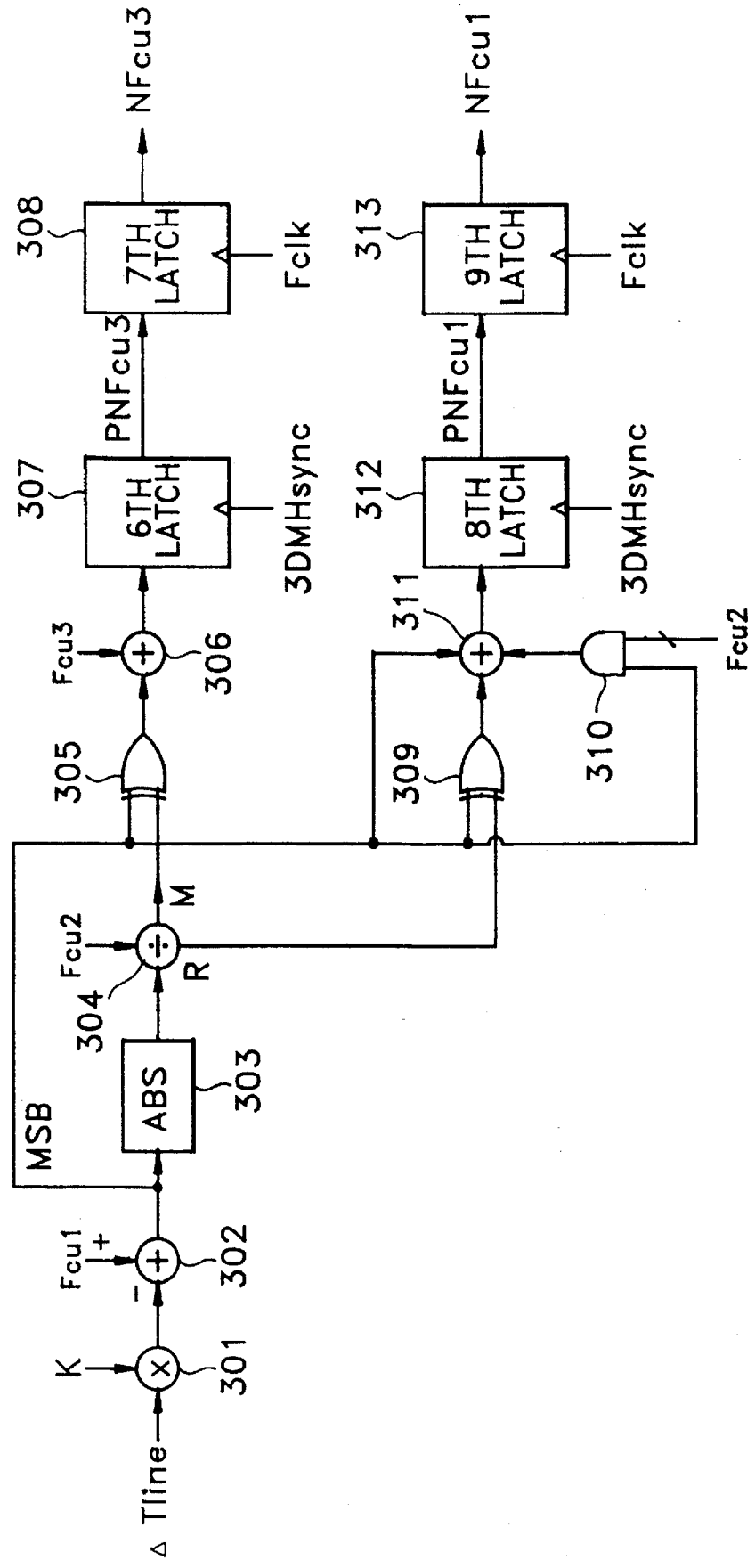
FIG. 10 is a detailed circuit diagram of the carrier color signal corrector shown in FIG. 6.

FIG. 10 is a detailed circuit diagram of the carrier color signal corrector 300 shown in FIG. 6.

The carrier color signal corrector is constituted by a second multiplier 301 for multiplying line jitter amount ΔTline and constant K determined by a system, a seventh subtracter 302 for subtracting the signal multiplied by second multiplier 301 from first coefficient Fcu1, an absolute value circuit 303 for outputting an absolute value of the signal subtracted by seventh subtracter 302, a second divider 304 for diving second coefficient Fcu2 by the absolute value output from absolute value circuit 303 so as to output a quotient M and a remainder R, a first exclusive OR gate 305 for performing an exclusive OR on the quotient M output from second divider 304 and the most significant bit (MSB) of the signal subtracted and output by seventh subtracter 302 so as to output the result, a second adder 306 for adding third coefficient Fcu3 to the signal output from first exclusive OR gate 305, a sixth latch 307 for synchronizing the signal added by second adder 306 with the three-clock delayed digital horizontal sync signal 3DMHsync so as to output the result, a seventh latch 308 for outputting third correction coefficient NFcu3, i.e., signal PNFcu3 which is latch-output from sixth latch 307 and synchronized with system clock signal Fclk, a second exclusive OR gate 309 for performing an exclusive OR on the remainder R output from second divider 304 and the most significant bit (MSB) of the signal subtracted and output by seventh subtracter 302 so as to output the result, an AND gate 310 for performing a logical product on second coefficient Fcu2 and the MSB of the signal subtracted and output from seventh subtracter 302, a third adder 311 for adding the MSB of the signal subtracted and output from seventh subtracter 302, the signal output from second exclusive OR gate 309 and the signal output from AND gate 310, an eighth latch 312 for synchronizing the signal added by third adder 311 with the three-clock delayed digital horizontal sync signal 3DMHsync so as to output the result, and a ninth latch 313 for outputting first correction coefficient NFcu1, i.e., signal PNFcu1 which is latch-output from eighth latch 312 and synchronized with system clock signal Fclk.

Figure 11:
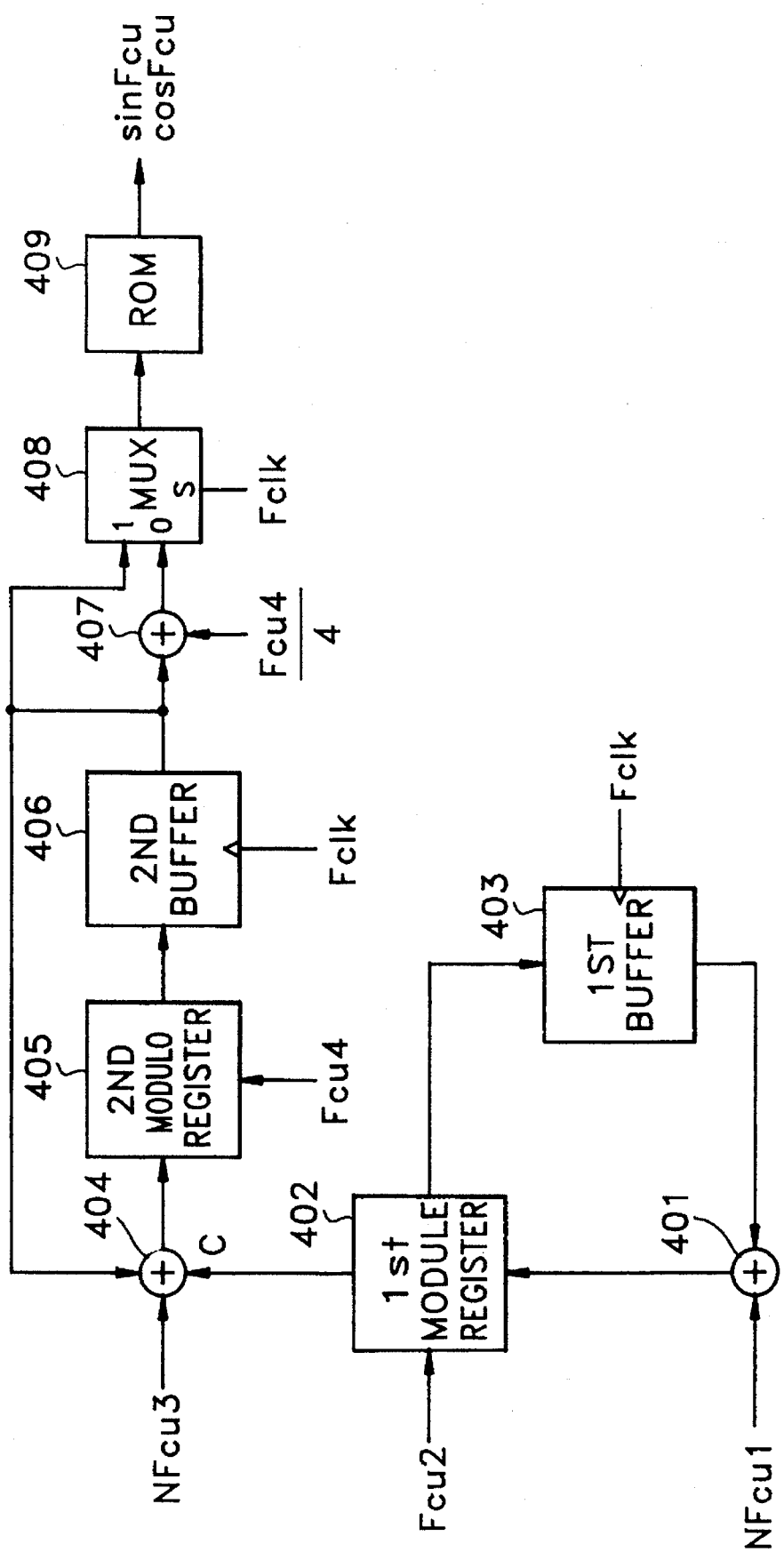
FIG. 11 is a detailed circuit diagram of the modulo counter shown in FIG. 6.

FIG. 11 is a detailed circuit diagram of modulo counter 400 shown in FIG. 7.

Modulo counter 400 is constituted by a fourth adder 401 for adding first correction coefficient NFcu1 output from seventh latch 308 of FIG. 10 to the signal output from first buffer 403, a first modulo register 402 for performing a modulo operation on the signal added by fourth adder 401 so as to output the result and outputting carry signal C when the operation result becomes second coefficient Fcu2 value, a first buffer 403 for receiving the value modulo-operated by first modulo register 402 so as to buffering-output the result by using system clock signal Fclk, a fifth adder 404 for adding carry signal C output from first modulo-register 402, an output signal of second buffer 406 and third correction coefficient NFcu3 output from ninth latch 313 of FIG. 10, a second modulo register 405 for performing a modulo operation on the signal added by fifth adder 404 with fourth coefficient Fcu4, a second buffer 406 for buffering-outputting an output of second modulo register 405 by using system clock signal Fclk, a sixth adder 407 for adding the signal output from second buffer 406 to a quarter value of fourth coefficient Fcu2, a multiplexer 408 for selecting the signal output from sixth adder 407 and the signal output from second buffer 406 by using system clock signal Fclk, and a ROM 409 for receiving the signal selected and output by multiplexer 408 so as to output sine frequency down-converting carrier color signal sinFcu and cosine frequency down-converting carrier color signal cosFcu.

Figure 12A:
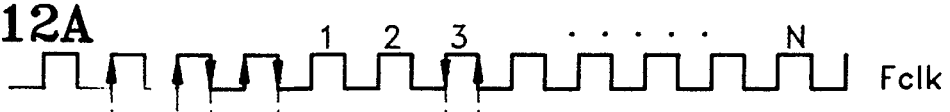
FIGS. 12A–12Q are waveforms illustrating the operations of the respective elements of the present invention.
Figure 12B:
Figure 12C:
Figure 12D:
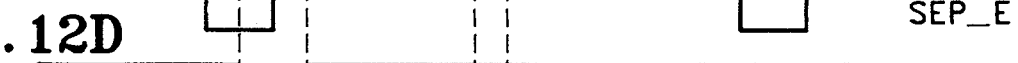
Figure 12E:
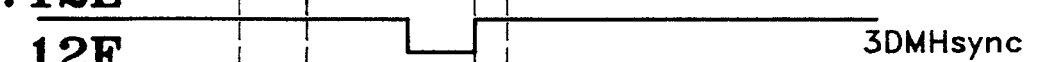
Figure 12F:
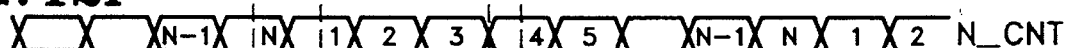
Figure 12G:
Figure 12H:
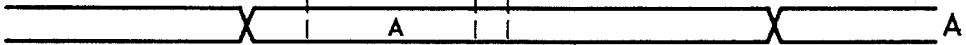
Figure 12I:
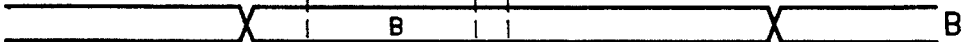
Figure 12J:
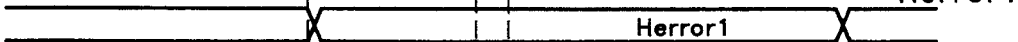
Figure 12K:
Figure 12L:
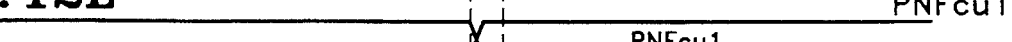
Figure 12M:
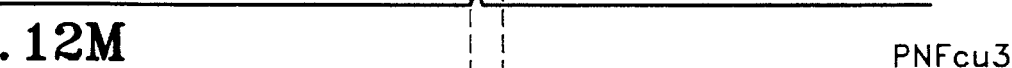
Figure 12N:
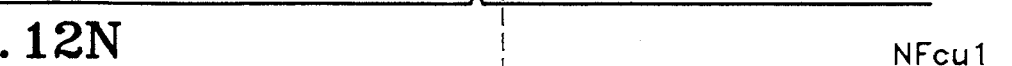
Figure 12P:
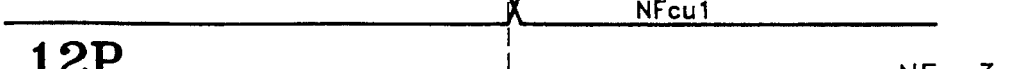
Figure 12Q:

FIGS. 12A–12Q are diagrams of operation waveforms present at respective portions of the present invention.

A preferred embodiment of the present invention will be explained with reference to the aforementioned FIGS. 6–12Q. First, the operation of the circuit shown in FIG. 6 will be described below.

If the signal input to horizontal sync converter 100 is an analog horizontal sync signal, it is one that has passed an A/D converter (not shown). Horizontal sync converter 100, receiving horizontal sync signal Hsync and system clock signal Fclk, extracts first and second horizontal sync separation point values A and B, and outputs clock pulse number N within one horizontal sync period, digital horizontal sync signal MHsync and three-clock-pulse-delayed digital horizontal sync signal 3DHsync.

Line jitter amount calculator 200 receives first and second horizontal sync separation point values A and B, digital horizontal sync signal MHsync and clock pulse number N within one horizontal sync period, all of which are output from horizontal sync converter 100, so that the actual horizontal sync period is calculated according to system clock Fclk, and that line jitter amount ΔTline is calculated by subtracting the standard horizontal sync period Lstandard from the actual horizontal sync period.

Carrier color signal corrector 300 receives first, second and third coefficients Fcu1, Fcu2 and Fcu3 and line jitter amount ΔTline output from line jitter amount calculator 200, thereby outputting first and third correction coefficients NFcu1 and NFcu3 for modulo counting.

Modulo counter 400 receives first and third correction coefficients NFcu1 and NFcu3 output from carrier color signal corrector 300, second and fourth coefficients Fcu2 and Fcu4 and one fourth of the fourth coefficient Fcu4/4, three of which are externally provided, thereby generating new frequency down-converting carrier color signals sinFcu and cosFcu for automatic frequency control.

The operation of generating the new frequency down-converting carrier color signal will be specifically explained with reference to FIGS. 7–12Q.

In FIG. 7, first latch 101 receives horizontal sync signal Hsync after the A/D conversion of FIG. 12B, and latches it according to system clock signal Fclk as shown in FIG. 12A.

Second latch 102 re-latches the first-latched horizontal sync signal output from first latch 101 according to system clock signal Fclk. First subtracter 103 subtracts the latched horizontal signal output from first latch 101 from the reference level value Thr for horizontal sync separation.

Second subtracter 104 subtracts the reference level value Thr for horizontal sync separation from the latched horizontal sync signal output from second latch 102. OR gate 105 logically sums the MSB of the subtracted signal output from first subtracter 103 and the MSB of the subtracted signal output from second subtracter 104, and outputs a signal as shown in FIG. 12C. Here, if the first and second horizontal sync separation points are both detected, the output of OR gate 105 is held "HIGH" for one period of the system clock.

First flip-flop 106 delays the inverted output of OR gate 105 for a predetermined period according to system clock Fclk input to its inverting clock port, thereby outputting digital horizontal sync signal MHsync as shown in FIG. 12D.

Third latch 107 receives the latched signal output from second latch 102 and latches it according to digital horizontal sync signal MHsync, thereby outputting first horizontal sync separation point value A as shown in FIG. 12H.

Fourth latch 108 receives the latched signal output from first latch 101 and latches it according to digital horizontal sync signal MHsync, thereby outputting second horizontal sync separation point value B as shown in FIG. 12I.

Counter 109 receives digital horizontal sync signal MHsync output from first flip-flop 106 as inverted load signal LD, thereby counting clock pulse number N within one horizontal sync period as shown in FIG. 12F. Fifth latch 110 latches clock pulse number N output from counter 109 according to digital horizontal sync signal MHsync, thereby outputting a signal as shown in FIG. 12G.

Second, third and fourth flip-flops 111, 112 and 113 delays digital horizontal sync signal MHsync for three clock pulses according to system clock signal Fclk, thereby outputting three-clock-pulse-delayed digital horizontal sync signal 3DHsync as shown in FIG. 12E.

Third subtracter 201 of FIG. 8 subtracts second horizontal sync separation point value B output from fourth latch 108 of FIG. 7 from reference level value Thr for horizontal sync separation. Fourth subtracter 202 subtracts second horizontal sync separation point value B from first horizontal sync separation point value A output from third latch 107 of FIG. 7. First divider 203 divides the signal output from third subtracter 201 by the signal output from fourth subtracter 202.

Fifth flip-flop 204 delays the signal output from first divider 203 according to digital horizontal sync signal MHsync, and outputs second separation error signal Herror2/Tclk as shown in FIG. 12K. Here, this output becomes the horizontal sync separation error signal of the present line.

Sixth flip-flop 205 delays second separation error signal Herror2/Tclk output from fifth flip-flop 204 according to digital horizontal sync signal MHsync, thereby outputting first separation error signal Herror1/Tclk as shown in FIG. 12J. Here, this output is the same as in equation (8), becoming the horizontal sync separation error signal of the previous line.

Fifth subtracter 206 subtracts second separation error signal Herror2/Tclk output from sixth flip-flop 205 from first separation error signal Herror1/Tclk output from fifth flip-flop 204, thereby outputting the error difference value.

First adder 207 adds the error difference value output from fifth subtracter 206 to the clock pulse number N within one horizontal sync period output from fifth latch 110 as shown in FIG. 7.

First multiplier 208 multiplies the added signal output from first adder 207 and time Tclk corresponding to one period of system clock signal Fclk used in horizontal sync separation, thereby outputting the actual horizontal sync period Lcurrent. Here, this output is the same as in equation (11).

Sixth subtracter 209 subtracts the standard horizontal sync period Lstandard from the actual horizontal sync period Lcurrent output from first multiplier 208, thereby outputting line jitter amount ΔTline. Here, the horizontal sync separation error can be obtained by replacing block T of FIG. 8 with FIG. 9C.

First, referring to FIGS. 9A and 9B, the horizontal dotted line indicates a reference level for determining a horizontal sync signal, with the vertical dotted line g being the start point of the actual sync period and the vertical dotted line h being the start point of the digital horizontal sync period separated at the leading edge of the system clock. The difference between dotted lines g and h is the horizontal sync separation error Herror. Reference character A is the first horizontal sync separation point value, with reference character B being the second horizontal sync separation point value.

Since triangle e and triangle f are similar, the rectangular sides of triangle e can be obtained with a previously known value, and one of the rectangular sides of triangle f can be also known, a proportional equation such as the following equation (26) is held good:

$$A+B : Tclk = B : Herror \qquad \text{equation-(26)}$$

Accordingly, separation error signal Herror/Tclk can be expressed as follows:

$$\frac{Herror1}{Tclk} = \left( \frac{B}{A+B} \right) \qquad \text{equation-(27)}$$

A circuit for embodying equation (27) using a hardware structure is shown in FIG. 9C. In FIG. 9C, adder 21 sums first and second horizontal sync separation point values A and B. Divider 20 divides the second horizontal sync separation point value B by the result A+B summed by adder 21. This output is the separation error signal Herror/Tclk.

Meanwhile, the second multiplier 301 shown in FIG. 10 multiplies line jitter amount ΔTline output from sixth subtracter 209 of FIG. 8 by constant K. Seventh subtracter 302 subtracts the signal multiplied by the second multiplier 301 from first coefficient Fcu1. Here, constant K is (Fcu×Fcu2+ Fcu1)/(Cyc$_{Fcu}$×Tcu).

Absolute value circuit 303 takes the signal subtracted from seventh subtracter 302 as an absolute value. Second divider 304 divides the second coefficient Fcu2 by the signal of the absolute value taken by the absolute value circuit 303, thereby outputting quotient M and remainder R.

First exclusive OR gate 305 exclusive-OR operates quotient M output from second divider 304 and the MSB of the signal subtracted from seventh subtracter 302.

Second adder 306 sums third coefficient Fcu3 and the signal output from first exclusive OR gate 305. Sixth latch 307 synchronizes the signal summed by the second adder 306 with the three-clock-pulse-delayed digital horizontal sync signal 3DMHsync, thereby outputting signal PNFcu3 as shown in FIG. 12M.

Seventh latch 308 synchronizes the signal latched by the six latch 307 with system clock signal Fclk, thereby outputting third correction coefficient NFcu3 as shown in FIG. 12P. The output of seventh latch 308 can be given as equation (20) or (23).

Second exclusive OR gate 309 exclusive-OR-operates remainder R output from second divider 304 and the MSB of the signal subtracted from seventh subtracter 302. AND gate 310 AND-operates the MSB of the signal subtracted from the seventh subtracter 302 and the second coefficient Fcu2.

Third adder 311 sums the MSB of the signal subtracted from seventh subtracter 302, the signal output from the second exclusive OR gate 309, and the signal logically multiplied from AND gate 310.

Eighth latch 312 synchronizes the signal summed in third adder 311 with three-clock-pulse-delayed digital horizontal sync signal 3DMHsync, thereby outputting signal PNFcu1 as shown in FIG. 12L.

Ninth latch 313 synchronizes the signal latched in eighth latch 312 with system clock signal Fclk, thereby outputting first correction coefficient NFcu1 as shown in FIG. 12N. The output of ninth latch 313 can be expressed as equation (22) or (24).

Here, first and second exclusive OR gates 305 and 309 uses a characteristic in which, given that two inputs of the exclusive OR gate are X and Y, and that its output is Z, when input X is "1," output Z is/X, and when input X is "0," output Z is Y.

Seventh and ninth latches 308 and 313 re-latch signals PNFcu3 and PNFcu1 output from sixth and eighth latches 307 and 312 for synchronization with modulo counter 400 which is synchronized with system clock signal Fclk.

If the frequencies of system clock Fclk and standard frequency down-converting color signal Fcu are determined, first-fourth coefficients Fcu1-Fcu4 are determined according to the expression (19), and first and third correction coefficients NFcu1 and NFcu3 are determined according to the expression $$\frac{|Fcu1 - (\Delta Tline) \times K|}{Fcu2}$$

and equation (25).

The first and third correction coefficients NFcu1 and NFcu3 output from seventh and ninth latches 308 and 313 are applied respectively to fourth and fifth adders 401 and 404 as shown in FIG. 11. Fourth adder 401 sums first correction coefficient NFcu1 as shown in FIG. 12N and the signal output from first buffer 403.

Second modulo register 402, if the signal summed in fourth adder 401 does not surpass the second coefficient Fcu2, stores the signal in first buffer 403, and if the summed signal surpasses the second coefficient Fcu2, outputs carry signal C to fifth adder 404 and stores the remainder in first buffer 403.

First buffer 403 receives the output from first modulo register 402 and buffers it according to system clock signal Fclk, thereby feeding it back to fourth adder 401.

Fifth adder 404 sums carry signal C output from first modulo register 402, the signal output from second buffer 406, and third correction coefficient NFcu3.

Second modulo register 405, if the signal summed in fifth adder 404 does not surpass fourth coefficient Fcu4, stores it in second buffer 406, and if the summed signal surpasses the fourth coefficient Fcu4, stores only the remainder in second buffer 406 and feeds it back to fifth adder 404.

Sixth adder 407 sums the signal output from second buffer 406 and one fourth the fourth coefficient. The fourth coefficient Fcu is divided so as to generate a cosine down frequency converting carrier color signal cosFcu having 90° of phase difference from that of sine frequency down-converting carrier color signal sinFcu in ROM 409.

Multiplexer 408 selects the signal buffered in second buffer 406 or the signal output from sixth adder 407 according to system clock signal Fclk.

ROM 409, made up with a look-up table, receives the signal selected by multiplexer 408 as the address signal, thereby alternately outputting sine frequency down-converting color signal sinFcu and cosine frequency down-converting carrier color signal cosFcu as shown in FIG. 12Q.

Since correction amount calculator 300 calculates the first and third correction coefficients NFcu1 and NFcu3 only once for every horizontal sync period and therefore it is not required for rapid timing. For a simple structure of the circuit, the present invention can be embodied by sharing a first divider 203 and a first multiplier 208 for calculating the line jitter amount, and a second divider 304 and second multiplier 301 of FIG. 10 for calculating a correction coefficient.

Accordingly, the present invention is advantageous in immediately performing normal AFC if the line jitter is not generated after line jitter is generated, as compared with the analog mode in which, when the PLL circuit for performing the AFC of the analog system largely generates the jitter and then returns to the original state, it is reconstructed by passing a few lines, to make the AFC normally operate in view of the analog characteristics.

As described above, the present invention performs automatic frequency control in digital form in a video processing system and compensates for jitter generated due to the head or tape characteristic, thereby resulting in sharp pictures.

What is claimed is:

1. A digital automatic frequency controlling method comprising the steps of:

(a) separating a digital horizontal sync signal from an input horizontal sync signal in response to a system clock, extracting a horizontal sync separation point value, and detecting the number of clock pulses within one horizontal sync period;

(b) calculating an actual horizontal sync period using said digital horizontal sync signal, said horizontal sync separation point value and said clock pulse number within one horizontal sync period, and calculating a line jitter amount by subtracting a standard horizontal sync period from said actual horizontal sync period; and (c) modulo-operating a standard frequency down-converting carrier color signal in response to said line jitter amount, and thereby generating a new frequency-corrected frequency down-converting carrier color signal.

2. A digital automatic frequency controlling method as claimed in claim 1, wherein said step (c) comprises the steps of:

generating a correction coefficient with respect to said standard frequency down-converting carrier color signal in response to said line jitter amount; and modulo-operating said standard frequency down-converting carrier color signal according to said generated correction coefficient, and generating new frequency-corrected sine and cosine frequency down-converting carrier color signals in response to said jitter amount.

3. In a method of controlling varying the frequency of a frequency down-converting carrier color signal according to a horizontal sync frequency so as to control the frequency automatically, a digital automatic frequency controlling method comprising the steps of:

(a) initializing a horizontal sync separation error of a previous line;

(b) separating a digital horizontal sync signal from an input horizontal sync signal based on a predetermined level and in response to a system clock with respect to a horizontal sync period of the input horizontal sync signal, and calculating the number of system clock pulses corresponding to a digital horizontal sync period;

(c) calculating a horizontal sync separation error of the present line based on a first transition of said system clock immediately preceding separation of the digital horizontal sync signal and the following system clock transition in the same direction immediately following said separation;

(d) calculating the horizontal sync period of the actual line using said system clock pulse number, the horizontal sync separation error of said present line, and the horizontal sync separation error of the previous line;

(e) subtracting a predetermined standard horizontal sync period from said actual horizontal sync period calculated in said horizontal sync period calculating step, and thereby calculating the jitter amount of said present line;

(f) deciding the degree of correction of said frequency down-converting carrier color signal in response to said jitter amount;

(g) calculating a correction coefficient corresponding to said correction degree; and (h) modulo-operating said frequency down-converting carrier color signal by using said correction coefficient, and thereby generating a new frequency down-converting carrier color signal.

4. A digital automatic frequency controlling circuit comprising:

a horizontal sync signal converter for separating a digital horizontal sync signal from an input horizontal sync signal in response to a system clock, extracting a horizontal sync separation point value, and detecting the number of clock pulses within one horizontal sync period;

a line jitter amount calculator for calculating an actual horizontal sync period by using said digital horizontal sync signal, said horizontal sync separation point value and said clock pulse number within one horizontal sync period, all of which are output from said horizontal sync converter, and calculating a line jitter amount by subtracting a standard horizontal sync period from said actual horizontal sync period; and a corrected-carrier color signal output unit for modulo-operating a standard frequency down-converting carrier color signal in response to said line jitter amount output from said line jitter amount calculator, and thereby generating a frequency-corrected frequency down-converting carrier color signal.

5. A digital automatic frequency controlling circuit as claimed in claim 4, wherein said corrected-carrier color signal output unit comprises:

a carrier color signal correcting unit for generating a correction coefficient with respect to said standard frequency down-converting carrier color signal in response to said line jitter amount; and a modulo counter for modulo-operating said standard frequency down-converting carrier color signal according to said generated correction coefficient, and generating new frequency-corrected sine and cosine frequency down-converting carrier color signals in response to said jitter amount.

6. A digital automatic frequency controlling circuit as claimed in claim 5, wherein said horizontal sync converter comprises:

a digital sync generator for detecting a transition point of said input horizontal sync signal, and generating the digital horizontal sync signal according to the system clock;

a horizontal sync separation point value extractor for extracting first and second horizontal sync separation point values based on a first transition of said system clock immediately preceding separation of the digital horizontal sync signal and the following system clock transition in the same direction immediately following said separation; and a clock signal counter for receiving said digital horizontal sync signal and counting the number of clock pulses within one horizontal sync period.

7. A digital automatic frequency controlling circuit as claimed in claim 6, wherein said digital horizontal sync generator comprises:

a first latch for latching said input horizontal sync signal according to said system clock;

a second latch for re-latching said horizontal sync signal latched by said first latch;

a first subtracter for subtracting said horizontal sync signal latched by said first latch from a predetermined reference level;

a second subtracter for subtracting a predetermined reference level from said horizontal sync signal latched by said second latch;

a first logic device for logically summing said subtracted signal output from said first subtracter and said subtracted signal output from said second subtracter; and a first delay device for delaying said logically summed signal output from said first logic device for a predetermined time according to said system clock.

8. A digital automatic frequency controlling circuit as claimed in claim 7, wherein said horizontal sync separation point value extractor comprises:

a first latch for latching said input horizontal sync signal according to said system clock;

a second latch for re-latching said horizontal sync signal latched by said first latch;

a third latch for latching the signal latched by said second latch according to said digital horizontal sync signal and outputting a first horizontal sync separation point value; and a fourth latch for latching the signal latched by said first latch according to said digital horizontal sync signal and outputting a second horizontal sync separation point value.

9. A digital automatic frequency controlling circuit as claimed in claim 8, wherein said clock signal counter comprises:

a counter loaded by said digital horizontal sync signal output from said first delay device for counting the number of clock pulses within one horizontal sync period; and a fifth latch for latching the number of clock pulses output from said counter according to said digital horizontal sync signal.

10. A digital automatic frequency controller as claimed in claim 9, further comprising a plurality of second delay devices for delaying said digital horizontal sync signal by a predetermined number of clock pulses according to said system clock and outputting said delayed digital horizontal sync signal.

11. A digital automatic frequency controlling circuit as claimed in claim 10, wherein said line jitter amount calculator comprises:

a third subtracter for subtracting said second horizontal sync separation point value from said predetermined reference level;

a fourth subtracter for subtracting said second horizontal sync separation point value from said first horizontal sync separation point value;

a first divider for dividing the signal output from said fourth subtracter by the signal output from said third subtracter;

a third delay device for delaying the signal output from said first divider according to said digital horizontal sync signal and outputting the horizontal sync separation error signal of the present line;

a fourth delay device for delaying the signal output from said third delay device according to said digital horizontal sync signal and outputting the horizontal sync separation error signal of the previous line;

a fifth subtracter for subtracting the signal output from said third delay device from the signal output from said fourth delay device and outputting the error difference value;

a first adder for summing said error difference value output from said fifth subtracter and said clock pulse number output from said horizontal sync signal converter;

a first multiplier for multiplying said summed signal output from said first adder by said system clock and outputting an actual horizontal sync period; and a sixth subtracter for subtracting a standard horizontal sync period from the actual horizontal sync period output from said first multiplier and outputting a line jitter amount.

12. A digital automatic frequency controlling circuit as claimed in claim 11, wherein said corrected-carrier color signal output unit comprises:

a second multiplier for multiplying said line jitter amount output from said sixth subtracter by a constant determined according to a system;

a seventh subtracter for subtracting the output of said second multiplier from a first coefficient of said standard frequency down-converting carrier color signal;

an absolute value unit for obtaining the absolute value of the signal output from said seventh subtracter;

a second divider for dividing the absolute value from said absolute value unit by a second coefficient of said standard frequency down-converting carrier color signal and outputting the divided signal as a quotient and a remainder;

a second logic device for exclusive-OR-operating said quotient output from said second divider and the MSB of said signal output from said seventh subtracter;

a second adder for summing a third coefficient and the signal output from said second logic device;

a third logic device for exclusive-OR-operating said remainder output from said second divider and the MSB of said signal output from said seventh subtracter;

a fourth logic device for logically multiplying the MSB of said signal output from said seventh subtracter by said second coefficient of said standard frequency down-converting carrier color signal; and a third adder for summing the MSB of said signal output from said seventh subtracter, the signal output from said third logic device, and said logically multiplied signal output from said fourth logic device.

13. A digital automatic frequency controlling circuit as claimed in claim 12, further comprising:

a sixth latch for synchronizing said summed signal output from said second adder with a digital horizontal sync signal delayed for a predetermined number of clock pulses and output from said second delay device;

a seventh latch for synchronizing the signal latched by said sixth latch with said system clock signal and outputting a third correction coefficient;

an eighth latch for synchronizing said summed signal output from said third adder with said digital horizontal sync signal delayed for a predetermined number of clock pulses and output from said second delay device; and a ninth latch for synchronizing the signal latched by said eighth latch with said system clock and outputting a first correction coefficient.

14. A digital automatic frequency controlling circuit as claimed in claim 13, wherein said modulo counter comprises:

a fourth adder for summing said first correction coefficient and a first input signal;

a first modulo register for, if said summed signal output from said fourth adder surpasses said second coefficient of said standard frequency down-converting carrier color signal, outputting a carry signal, and if not, outputting said summed signal;

a first buffer for receiving a modulo-operated value from said first modulo register and buffering said operated value according to said system clock, thereby feeding it back to said fourth adder as said first input signal;

a fifth adder for summing said carry signal output from said first modulo register, said third correction coefficient, and a second input signal;

a second modulo register for, if the signal output from said fifth adder surpasses said fourth coefficient of said standard frequency down-converting carrier color signal, outputting the remainder, and if not, outputting the output of said fifth adder;

a second buffer for buffering the signal output from said second modulo register and feeding it back to said fifth adder as said second input signal;

a sixth adder for summing said buffered signal output from said second buffer and one fourth said fourth coefficient;

a selector for selecting the signal output from said second buffer or the signal output from said sixth adder; and a memory for receiving said selected signal output from said selector as an address signal and outputting sine and cosine frequency down-converting carrier color signals.

15. A method of controlling varying the frequency of a frequency down-converting carrier color signal as claimed in claim 3, further comprising the steps of:

(i) substituting the horizontal sync separation error of the previous line for the horizontal sync separation error of the present line obtained in said horizontal sync separation error calculating step, whereby one horizontal sync period is delayed after the separation error processing, and said steps (b) through (i) are repeated with respect to a next line, thereby digitally performing automatic frequency control.

16. A digital automatic frequency controlling circuit as claimed in claim 14, wherein said memory is a ROM.

\* \* \* \* \*